United States Patent

Lacombe

[11] Patent Number: 5,866,878
[45] Date of Patent: Feb. 2, 1999

[54] KETTLE WITH POWER CONNECTOR MODULE

[75] Inventor: Jacques Lacombe, Gray, France

[73] Assignee: SEB S.A., Ecully Cedex, France

[21] Appl. No.: 788,518

[22] Filed: Jan. 24, 1997

[30] Foreign Application Priority Data

Jan. 25, 1996 [FR] France ................................ 96 00866

[51] Int. Cl.⁶ .............................. A47J 27/21; H05B 3/02; H05B 3/06
[52] U.S. Cl. .......................... 219/441; 219/435; 174/52.3
[58] Field of Search .................................. 219/385–387, 219/432, 435–438, 441; 174/52.1, 52.2, 52.3, 58, 61; 439/620, 709

[56] References Cited

U.S. PATENT DOCUMENTS 3,725,643  4/1973  Clausse .................................. 219/441
4,358,666  11/1982  Taylor ..................................... 219/437
4,842,551  6/1989  Heimann .................................. 174/58

FOREIGN PATENT DOCUMENTS

| 0595085 A1 | 10/1993 | European Pat. Off. . |
| 2446576 | 1/1980 | France . |
| 2708407 | 7/1993 | France . |
| 1430229 | 3/1976 | United Kingdom .................. 219/437 |

Primary Examiner—Mark H. Paschall
Assistant Examiner—J. Pelham
Attorney, Agent, or Firm—Young & Basile, P.C.

[57] ABSTRACT

A kettle includes a water tank, an electrical element under the bottom of the tank, connecting members to be connected to an electrical power supply and arrangements for regulating the operation of the element. The regulator arrangements and the connecting members include pins to be inserted in a connection module. Electrical connecting wires for connecting the pins are accommodated inside the connection module.

17 Claims, 4 Drawing Sheets

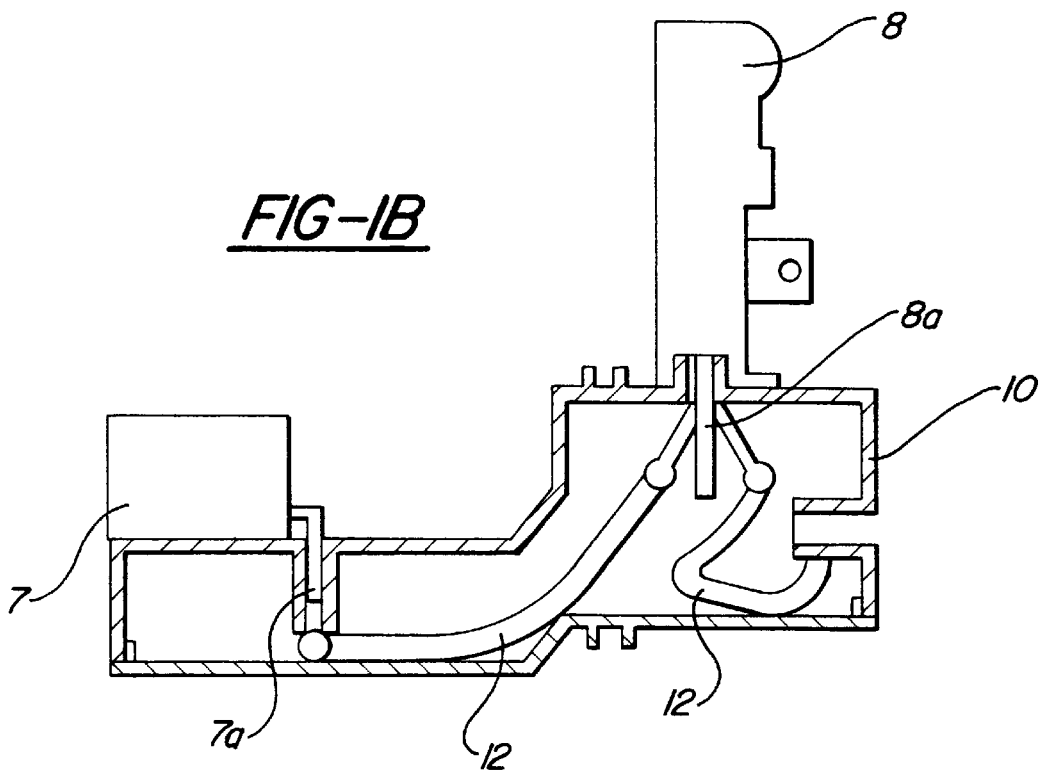
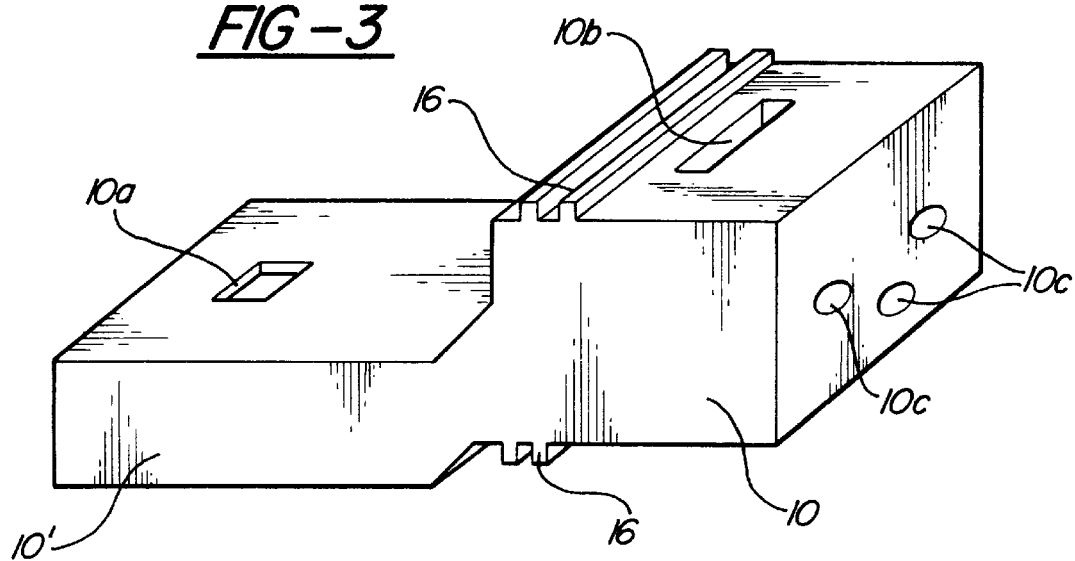

1

KETTLE WITH POWER CONNECTOR MODULE

BACKGROUND OF THE INVENTION

1. Field of the Invention

The present invention concerns an electric kettle with a heater plate and a connecting module for kettles of this kind.

2. Description of the Prior Art

Electric kettles with a heater plate, like that described in document FR-A-93 09 467, which have a tank for the liquid to be heated, usually water, and electrical heating means disposed under the bottom of the tank to heat the latter and to boil the liquid are known in themselves.

Such kettles also include an on-off type manual control to control the operation of the heating means and regulator means adapted to modify, and in particular to interrupt, the operation of the electrical heating means according to the temperature of the bottom of the tank or of the steam, for example. Connection members are connected to an electrical power supply either by an electrical cord connected to the connecting members, usually removably, or by means of an electrical power supply base on which the "cordless" kettle is placed while heating the liquid, the connection members terminating under the base of the kettle where they come into contact with connection members inside the power supply base.

In conventional kettles the many separate regulation and connection components are electrically connected by a plurality of electrical connecting wires under the heater plate of the tank and in the handle of the kettle.

The assembly of such kettles is therefore difficult and time-consuming because many intermediate connecting members are used.

Passing electrical connecting wires between the various parts of the kettle requires additional means for sealing and electrically insulating the various parts of the kettle.

The aim of the present invention is to simplify the connection of the regulation and connection components of a kettle with a heater plate and thereby to obtain a lower cost construction of "cordless" kettles with a power supply base or kettles with a removable power supply cord.

SUMMARY OF THE INVENTION

The invention consists in an electric kettle including a tank for liquid to be heated, electric heater means disposed under the bottom of said tank, manual means for controlling the operation of said electrical heating means, connection members adapted to be connected to electrical power supply means, regulator means adapted to modify the operation of said electrical heating means and an electrically insulative material connection module, the regulator means and the connecting members including pins adapted to be inserted into said connection module and electrical connecting wires connecting the pins of the regulation means and the connecting members are housed in said connection module.

The electrical connections between the regulator means and the connection members are made inside the connecting module, in a sealed and electrically insulated area.

The regulator and connection means being plugged directly into the connection module, the assembly of the electric kettle is simplified and a highly economic construction results.

In a preferred embodiment of the invention the kettle further comprises a steam sensor and a steam vent near a top edge of said tank and leading into a handle of said kettle, said steam sensor being disposed under said handle and fixed by a pin to said connection module.

This arrangement of the steam sensor, whereby it is plugged directly into the connection module, eliminates all the electrical connecting wires located inside the handle of conventional kettles.

A steam passage preferably extends substantially parallel to a lateral wall of said tank between said steam passage and said steam sensor.

This relatively short steam passage, the length of which is substantially equal to the height of the tank, gives the steam sensor a very short response time.

In an advantageous version of the invention, the regulator means include a thermal limiter disposed under said bottom of said tank and mounted on said heating means and said connection module includes an extension part extending under said bottom of said tank, said thermal limiter being fixed by a pin to said extension part.

This latter feature also eliminates all exposed electrical connecting wires in the heating area of the kettle, so improving electrical safety.

The thermal limiter is also fitted in a very simple way, by inserting an electrical contact pin into the connection module.

In another aspect, the invention consists in a connection module for an electric kettle comprising orifices adapted to receive pins of said regulator means and said connection members, electrical connection wires extending within said module between said orifices.

The connection module thus forms a one-piece assembly into which the various connection and regulator means are plugged directly.

The mounting of the electrical wires in the module can therefore be carried out independently of the assembly of the kettle.

Other features and advantages of the invention will emerge from the following description given by way of non-limiting example with reference to the accompanying drawings.

BRIEF DESCRIPTION OF THE DRAWINGS

FIGS. 1A and 1B show an integral connection module and thermal limiter.

FIG. 3 is a perspective view of a connection module in accordance with the invention.

DETAILED DESCRIPTION OF THE PREFERRED EMBODIMENTS

Figure 1:
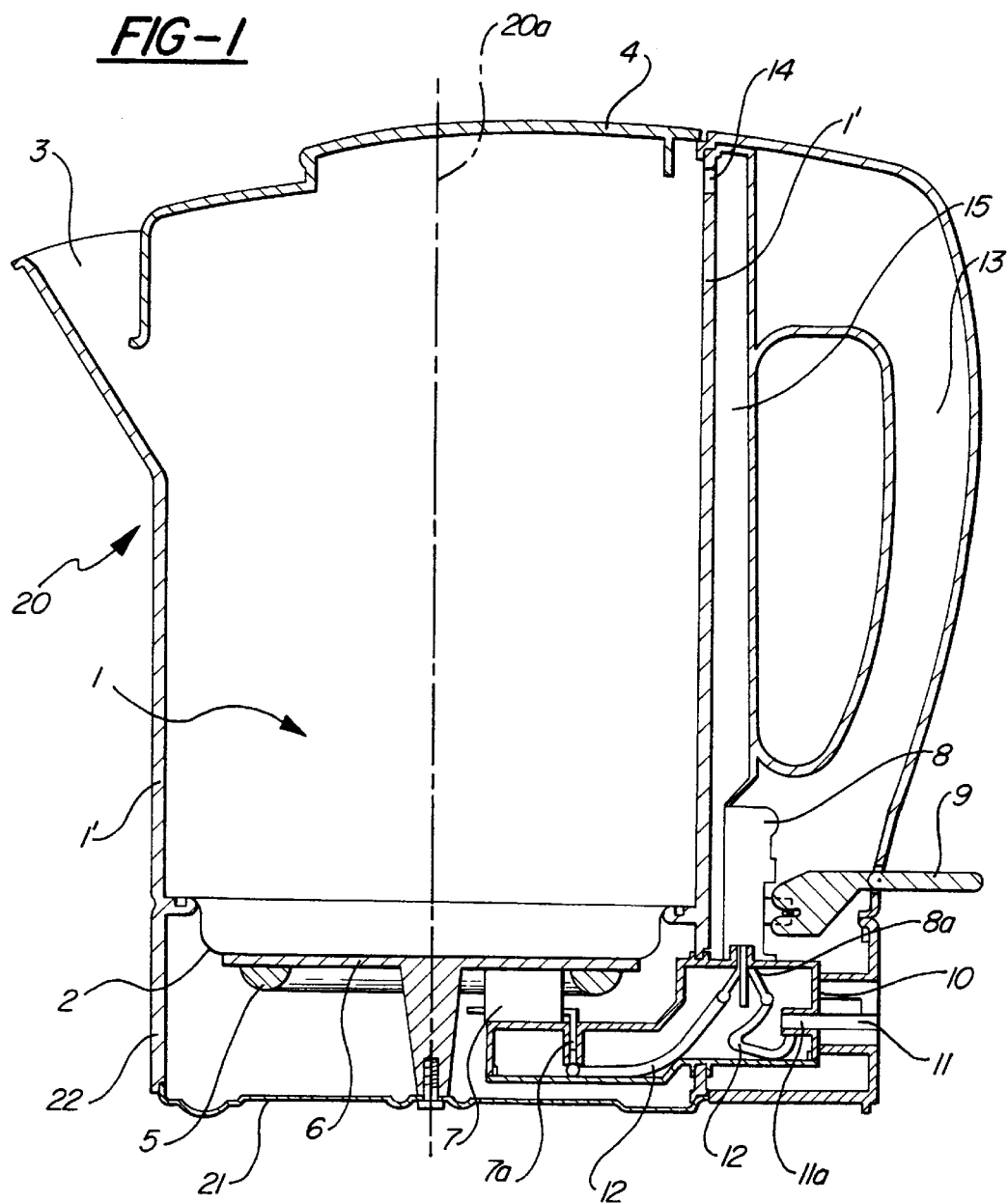
FIG. 1 is a sectional view of a first embodiment of a kettle in accordance with the invention.
Figure 1A:
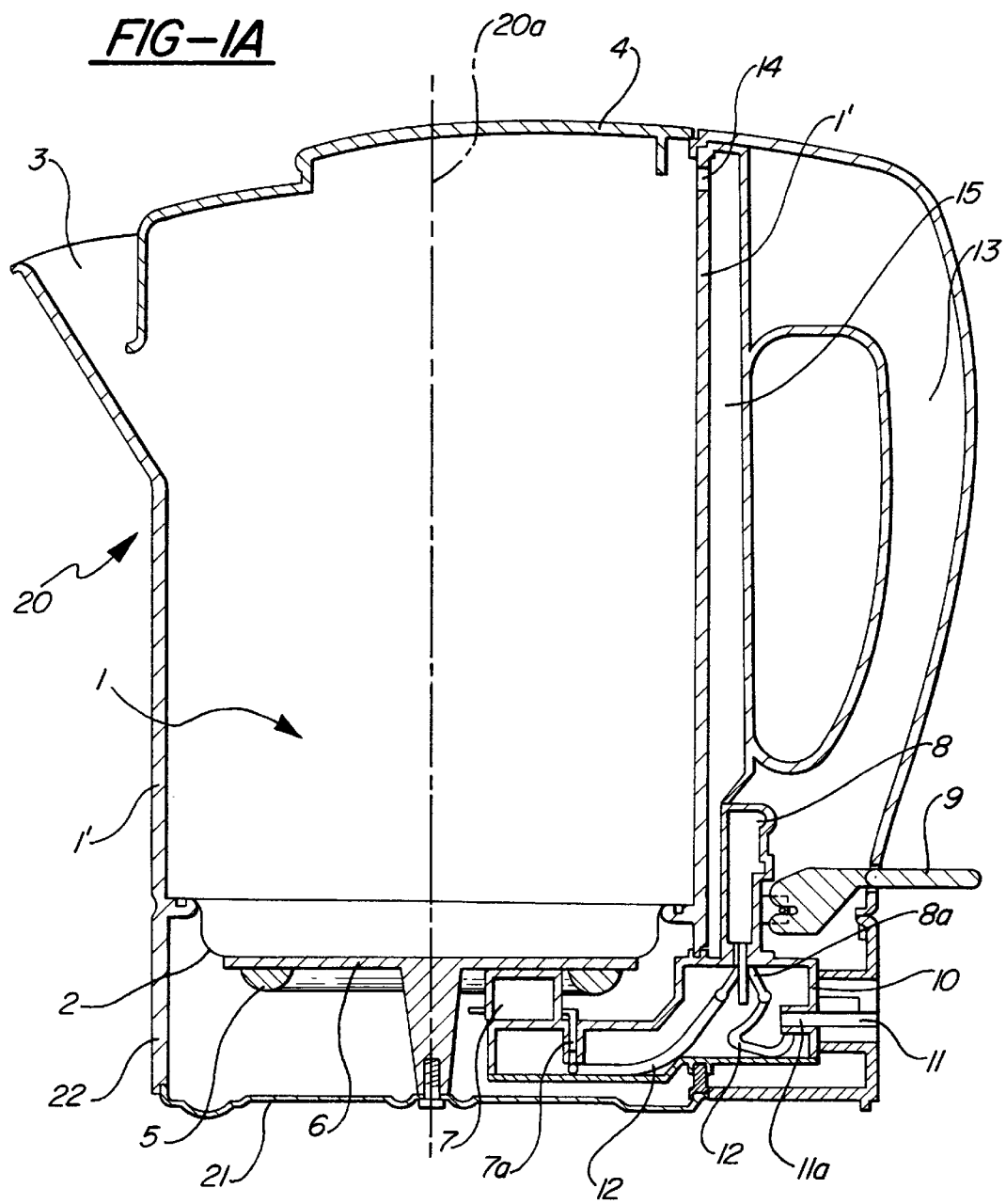
Figure 2:
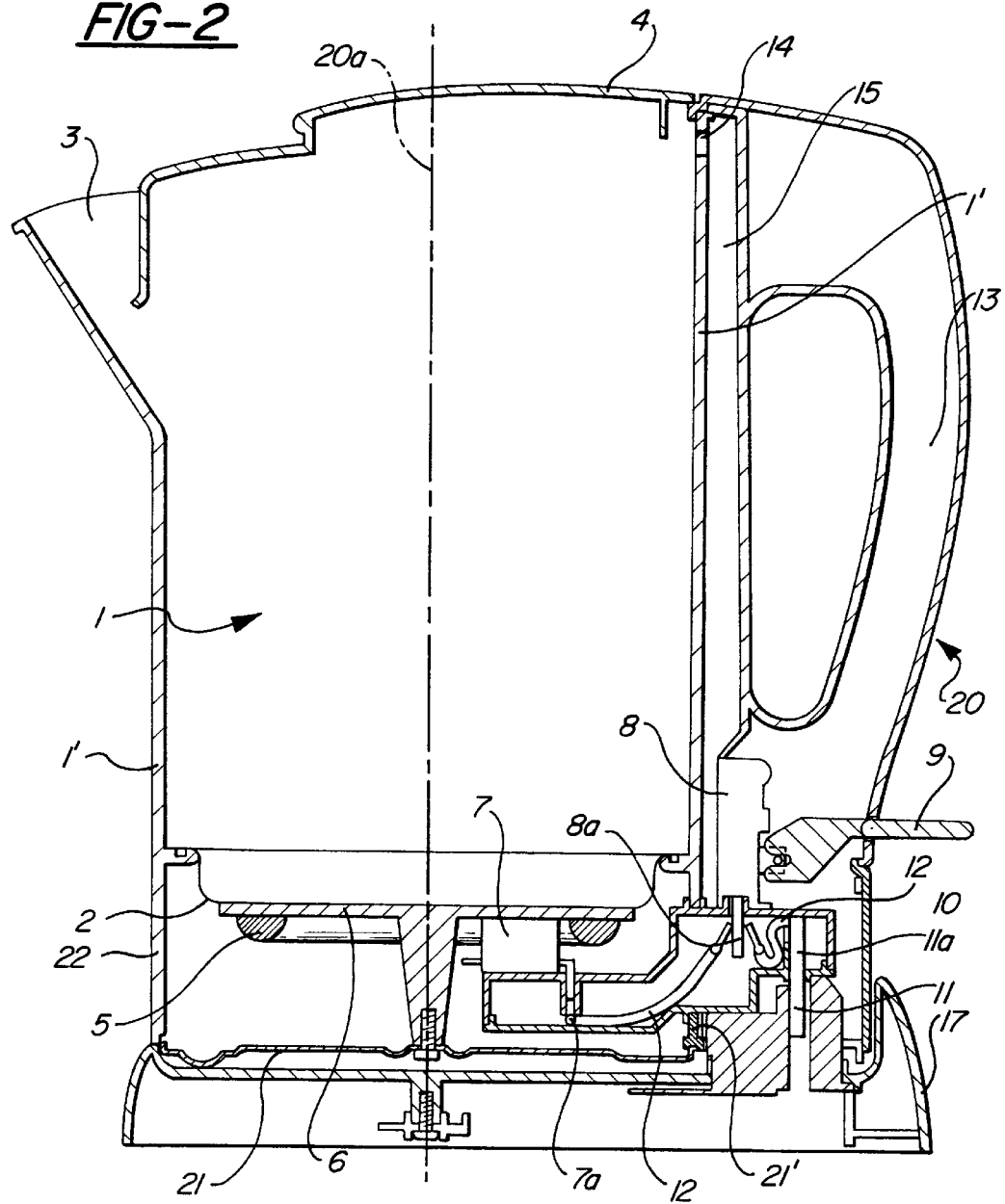
FIG. 2 is a sectional view of a second embodiment of a kettle in accordance with the invention.

Referring firstly to FIGS. 1 and 2, an electric kettle 20 includes a tank 1 for liquid to be heated, such as water. A pouring spout 3 is provided at the top edge of the tank 1 and a lid 4 closes off virtually all of the tank 1.

Heating means 5 are disposed under the bottom 2 of the tank 1. The heating means may comprise a tubular electrical element 5, a thermal diffusion plate being fixed between the bottom 2 and the electrical element 5 in order to improve the transfer of heat to the tank 1. One such heating plate arrangement is described in document FR-A-93 09 467, for example.

Means 9 for manually controlling the operation of the heating means are provided at an accessible position on one side 22 of the kettle. These manual control means may be an on-off button controlling the supply of electrical power to the element 5.

Connection members 11 are adapted to be connected to electrical power supply means.

The kettle 20 also comprises regulator means 7, 8 able to modify the operation of the electrical element 5.

The kettle 20 includes a steam sensor 8, a steam vent 14 being provided near the top edge of the tank and leading into the handle 13 of the kettle 20. The steam sensor 8 may comprise a bimetallic strip, for example, which above a certain temperature cuts off the supply of electrical power to the element 5.

The regulator means also include a thermal limiter 7 disposed under the bottom 2 of the tank and mounted on the heating means 5. The thermal limiter 7 may serve as a conventional thermostat with regard to the electrical element and as a thermal cut-out in the event of overheating of the bottom of the tank, in particular if the tank is empty.

A connection module 10 shown in FIG. 3 is made from an electrically insulative material, for example a heat-resistant plastics material.

The module includes orifices 10a, 10b, 10c adapted to receive pins 7a, 8a, 11a of the steam sensor 8, the thermal limiter 7 and the connecting members 11.

As shown in section in FIGS. 1 and 2, electrical connecting wires 12 extend inside the module 10 between the orifices 10a, 10b and 10c. These connecting wires 12 are fixed in the module so that their ends are in electrical contact with the pins 7a, 8a, 11a when the latter are inserted in the orifices in the module 10.

The steam sensor 8 is preferably under the handle 3 and is fixed to the connection module 10 by a pin 8a inserted through an orifice 10b.

The steam sensor 8 may therefore be removably plugged into the connection module 10.

It can instead be in one piece with the connection module 10, in order to simplify further the assembly of the kettle 20.

A steam passage 15 extends parallel to a lateral wall 1' of the tank 1 between the steam vent 14 and the steam sensor 8. The steam passage 15 is therefore substantially vertical, the steam sensor 8 being aligned with the bottom end of the passage 15.

Steam therefore comes into contact with the steam sensor 8 very quickly, enabling the electrical power supply to be cut off in a very short time, as soon as the liquid in the kettle 20 boils.

Since the steam sensor 8 is elongate in shape and is disposed vertically under the steam passage 15, the electrical safety of the kettle 20 is further improved by the favorable behavior of the steam sensor 8 in regard of any trickling water. Water does not tend to stagnate on the steam sensor 8, but rather to flow towards the base 21 of the kettle 20, over the sealed connection module 10.

The latter has a part disposed in the body of the kettle 20 under the handle 13 and an extension part 10' extending under the bottom 2 of the tank 1, the thermal limiter 7 being fixed to the extension part 10' of the module by a pin 7a inserted through an orifice 10a.

Like the steam sensor 8, the thermal limiter may be removably plugged into or in one piece with the connection module 10. In the latter case a one-piece unit comprising the module 10, the thermal limiter 7 and the steam sensor 8 may be constructed separately from the kettle 20, facilitating the assembly of the kettle.

The manual control means 9 are preferably mounted directly on the steam sensor 8 so that the cutting off of the electrical power supply by the steam sensor 8 also moves the manual control means 9 to their "off" position.

As all of the control means 9 are outside the heating area of the kettle, a perfect static steel may be formed around the connection module 10. The latter is preferably fixed to the base 21 of the kettle 20, for example by means of one or more grooves 16 on the top and bottom faces of the module 10 which accommodate projections 21' on the base 21 of the kettle 20 or a bottom end of a lateral wall 1' of the tank 1.

In the embodiment shown in FIG. 1, the connection members 11 are pins 11 extending parallel to the base 21 of the kettle 20 and projecting from a lateral wall 22 of the kettle 20. A removable electrical power cord can therefore be fixed to these pins 11 to connect the kettle to an electrical power supply.

In a different embodiment shown in FIG. 2 the connecting pins 11 are parallel to a vertical axis 20a of the kettle 20 and project from the bottom of the kettle 20, at the level of its base 21. This type of assembly is ideally suited to "cordless" kettles with a separate power supply base 17 on which the kettle 20 is placed.

In a manner that is known in itself the connecting pins 11 then come into electrical contact with electrical connection members inside the base 17.

Because it is near the base 21 of the kettle 20, the connection module 10 of the invention enables very simple construction of either a kettle with a removable power cord or a cordless kettle.

Of course, many modifications may be made to the examples described hereinabove without departing from the scope of the invention.

There is claimed:

1. An electric kettle including a tank for liquid to be heated, electric heater means disposed under the bottom of said tank, manual means for controlling the operation of said electrical heating means, connecting members adapted to be connected to electrical power supply means, regulator means adapted to modify the operation of said electrical heating means, and an electrically insulating connection module, said regulator means and said connecting members including pins adapted to be inserted into said connection module, and electrical connecting wires housed in the connection module and adapted to connect the pins of the regulator means and the connecting members.

2. An electric kettle as claimed in claim 1 further comprising a steam sensor and a steam vent in the tank near a top edge of said tank and leading into a handle of said kettle, said steam sensor being disposed under said handle and fixed by a pin to said connection module.

3. The electric kettle claimed in claim 2 wherein said steam sensor is integrally formed with said connection module.

4. An electric kettle as claimed in claim 2 wherein a steam passage in the handle extends substantially parallel to a lateral wall of said tank between said steam vent and said steam sensor.

5. The kettle claimed in claim 1 wherein said control means include a thermal limiter disposed under said bottom of said tank and mounted on said heating means and said connection module includes an extension part extending under said bottom of said tank, said thermal limiter being fixed by a pin to said extension part.

6. The kettle claimed in claim 5 wherein said thermal limiter is integrally formed with said connection module.

7. The kettle claimed in claim 1 wherein said connecting members are pins extending parallel to said base of said kettle and projecting from a lateral wall of said kettle.

8. The kettle claimed in claim 1 wherein said connecting members are pins extending parallel to a vertical axis of said kettle and projecting from the bottom of said kettle.

9. A connection module for an electric kettle as claimed in claim 1 comprising orifices adapted to receive pins of said control means and said connection members, electrical connecting wires extending within said module between said orifices.

10. The kettle claimed in claim 1, wherein the connection module and the regulator means are integrated as a unit separately from the kettle.

11. The kettle claim in claim 10, wherein the regulator means comprises a steam sensor.

12. The kettle claimed in claim 10, wherein the regulator means comprises a thermal limiter.

13. The kettle as claimed in claim 10, wherein the regulator means comprises a steam sensor and a thermal limiter.

14. The kettle claimed in claim 10, wherein the connection module and the regulator means are formed integrally as a one piece unit separately from the kettle.

15. The kettle claimed in claim 10, wherein the connection module and the regulator means are removably plugged together as a unit separately from the kettle.

16. The kettle as claimed in claim 4, wherein said steam sensor is elongate in shape and disposed vertically under the steam passage such that water does not collect on the steam sensor.

17. The kettle as claimed in claim 1, wherein the connection module defines a sealed and electrically insulated area for electrical connections between the regulator means and the connecting members.

* * * * *